(12) United States Patent
Yeo et al.

(10) Patent No.: US 8,663,739 B2
(45) Date of Patent: Mar. 4, 2014

(54) AEROGEL MAT AND MANUFACTURING METHOD THEREOF

(75) Inventors: Jeong-Gu Yeo, Daejeon (KR); Young-Soo Ahn, Daejeon (KR); Churl-Hee Cho, Daejeon (KR); Jeong Min Hong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 155 days.

(21) Appl. No.: 13/258,225

(22) PCT Filed: Jun. 10, 2010

(86) PCT No.: PCT/KR2010/003737
§ 371 (c)(1),
(2), (4) Date: Sep. 21, 2011

(87) PCT Pub. No.: WO2010/143902
PCT Pub. Date: Dec. 16, 2010

(65) Prior Publication Data
US 2012/0025127 A1 Feb. 2, 2012

(30) Foreign Application Priority Data

Jun. 11, 2009 (KR) .................. 10-2009-0052075

(51) Int. Cl.
*B05D 3/02* (2006.01)

(52) U.S. Cl.
USPC ........................................ 427/376.2

(58) Field of Classification Search
USPC ........................ 427/376.2; 442/120
See application file for complete search history.

(56) References Cited

U.S. PATENT DOCUMENTS 5,738,801 A * 4/1998 Ziegler et al. .............. 252/62
2005/0046086 A1 * 3/2005 Lee et al. .................. 264/444

FOREIGN PATENT DOCUMENTS

| KR | 1019990064149 | 7/1999 |
| KR | 1020000057244 A | 9/2000 |
| KR | 100385829 | 5/2003 |
| KR | 1020050088315 A | 9/2005 |
| KR | 1020060049618 A | 5/2006 |
| KR | 100710887 B1 | 4/2007 |
| WO | 2008051029 A1 | 5/2008 |

OTHER PUBLICATIONS

Bangi et al "A New Route for Preparation of Sodium-silicate-based Hydrophobic Silica Aerogels via Ambient-pressure Drying", Sci. Technol. Adv. Mater. 9 (2008) pp. 1-10.*
International Search Report and Written Opinion dated Jan. 12, 2011 for International Application No. PCT/KR2010/003737, filed Jun. 10, 2010.

* cited by examiner

*Primary Examiner* — Nathan Empie
(74) *Attorney, Agent, or Firm* — Brian R. Morrison; Westman, Champlin & Koehler, P.A.

(57) ABSTRACT

The present invention relates to a method of manufacturing a mat containing aerogel and to a mat manufactured using this method. A method of manufacturing a mat containing silica aerogel according to an aspect of the invention includes: (S1) producing a wet gel by mixing water glass and alcohol in a reactor; (S2) modifying a surface of the wet gel by adding an organic silane compound and an organic solvent to the reactor and mixing; (S3) separating a upper liquid from a solution in the reactor and impregnating a fibrous matrix with the upper liquid; and (S4) drying the fibrous matrix impregnated with the upper liquid. According to an aspect of the invention, a mat containing silica aerogel can be manufactured using only water glass as raw material, even when applying the drying process in an ambient environment, without using expensive materials or supercritical apparatus.

8 Claims, 1 Drawing Sheet

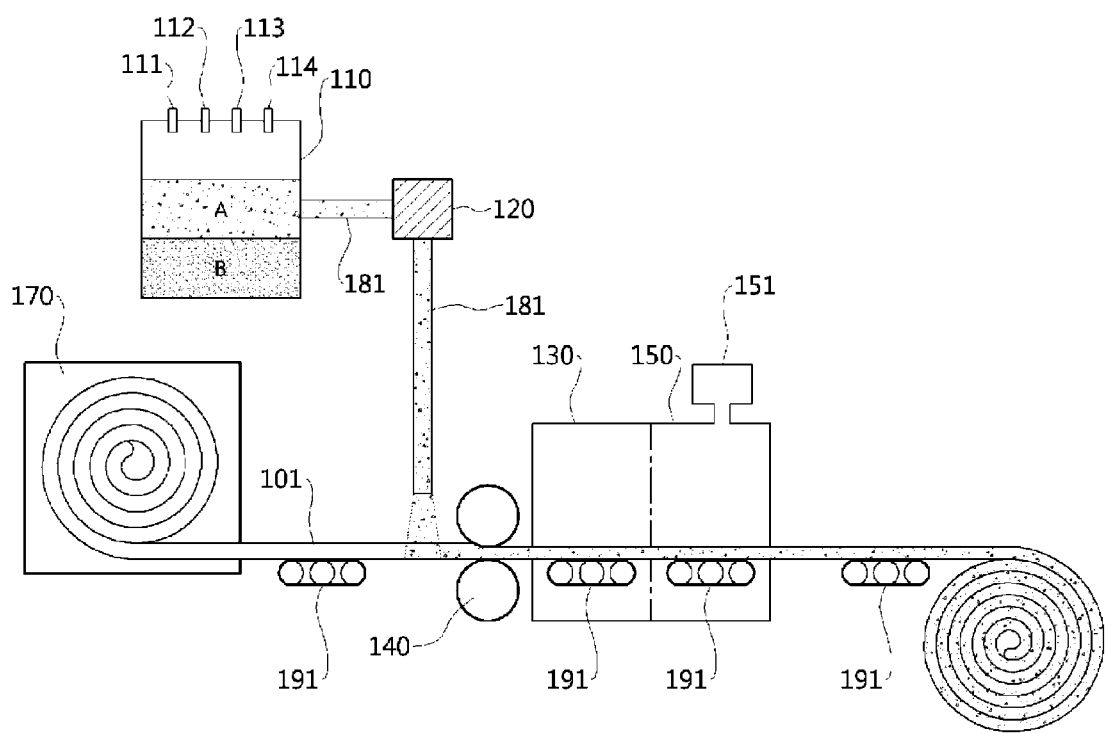

AEROGEL MAT AND MANUFACTURING METHOD THEREOF

CROSS-REFERENCE TO RELATED APPLICATION

This Application is a Section 371 National Stage Application of International Application No. PCT/KR2010/003737, filed Jun. 10, 2010 and published as WO2010/143902 on Dec. 16, 2010, the contents of which are hereby incorporated by reference in their entirety.

TECHNICAL FIELD

The present invention relates to a method of manufacturing a mat containing aerogel and to a mat manufactured using this method. More particularly, the invention relates to a method of manufacturing a mat containing aerogel using water glass under ambient drying conditions.

BACKGROUND ART

An aerogel is a porous material having one of the highest levels of porosity, of up to 99%, of any known solid. The silica aerogel, which is a common type of inorganic aerogel, may be obtained by forming a gel, by subjecting a silica precursor solution to a sol-gel condensation reaction, and then drying the gel under supercritical conditions or ambient-pressure conditions, to yield an aerogel having a porous structure full of air. Due to its highly porous structure, as noted above, an aerogel is prone to shattering, and thus in practical applications, the aerogel may be placed in a particular container (e.g. a skylight panel) or combined with a fabric matrix into a composite body (e.g. a mat), to be used in a commercially available product having a physically stable structure.

With the conventional technology for manufacturing a mat containing silica aerogel, the mat may easily undergo an increase in density when it is manufactured under ambient drying conditions. This is because, as the ambient drying method may involve replacing the pore water with a volatile organic solvent and removing the solvent at or above the vaporizing temperature, there may be drying shrinkage caused by solid/liquid interfacial forces from the water or organic solvent remaining within the silica network. Since the attractive characteristics of the aerogel, such as super insulation, light weight, soundproofing, and low permittivity, are manifested by its unique porous structure of having 90-99% of the internal space empty, the shrinkage described above can make it more difficult for the aerogel to provide these characteristics. The counter-measures against this shrinkage problem according to the related art are to perform the drying under supercritical conditions, under which there is no solid/liquid interfacial forces, or to strengthen the silica network and improve the adhesion with fiberweb by adding an expensive alkoxide and aging in the alkoxide during an intermediate process.

Also, if inexpensive water glass is used in place of the expensive alkoxide material in an effort to reduce manufacturing costs, the process may become more complicated and additional costs may be incurred, because of the additional sol-preparation process through ion exchange columns and the numerous rounds of wet-gel cleansing in order to remove impurities present in water glass.

Also, since an unmodified, hydrophilic gel is impregnated into fibers and subjected to a hydrophobic modification reaction, the fibers can be damaged, and the adhesion between the fibers and the aerogel may be weakened, resulting in the aerogel flaking off as powder from the composite body after drying.

Korean Registered Patent No. 10-0385829, which relates to manufacturing a composite body using silica aerogel, teaches a method that uses water glass or an alkoxide as raw material and applies hydrolysis to produce a sol. First, when using an alkoxide as the raw material, a fiber web is immersed in a sol, and the consecutive processes of aging, replacing pore water, and surface-modification are applied, followed by ambient pressure drying. When water glass is used as a starting material, the manufacture does not include drying under normal pressure and instead uses a supercritical apparatus for the drying. Consequently, the costs of the raw materials were reduced, but an expensive supercritical apparatus has to be used, and it is impossible to perform the manufacture continuously.

Also, in the disclosure of Korean Registered Patent No. 10-0710887, the materials of water glass and an alkoxide are mixed together in a certain ratio, a fiber web is immersed in the mixed solution, and the processes of aging, replacing pore water, and surface-modification are applied, after which drying is performed under normal pressure. Here, while increasing the relative percentage of the alkoxide led to lower density (0.11-0.14 g/mL) and greater pore volume (2-4 g/cc) and pore size (14-26 nm), the properties of the fiber composite manufactured using only water glass showed a high density (0.2 g/mL), small pore volume (1.5 g/cc) and small pore size (10 nm).

As set forth above, using a conventional manufacturing method may be the complicated, discontinuous, and expensive process for obtaining the silica aerogel fiber composite that provides the mechanical strength. As such, there is active research to produce a silica aerogel composite in an ambient environment in pursuit of a simple and lowcost manufacturing process.

DISCLOSURE OF INVENTION

Technical Problem

To resolve the problems described above, an aspect of the invention aims to provide a method of manufacturing a mat containing silica aerogel by using only water glass as raw material and drying in an ambient environment, without using expensive materials or using supercritical apparatus.

Solution to Problem

To achieve the above objectives, an aspect of the invention provides a method of manufacturing a mat containing silica aerogel that includes: (S1) producing a wet gel by mixing water glass and alcohol in a reactor; (S2) modifying a surface of the wet gel by adding an organic silane compound and an organic solvent to the reactor and mixing; (S3) separating a upper liquid from a solution in the reactor and impregnating a fibrous matrix with the upper liquid; and (S4) drying the fibrous matrix impregnated with the upper liquid.

The alcohol may preferably be one or more selected from a group consisting of ethanol, isopropyl alcohol, and methanol.

More preferably, the preparation of the wet gel may include adding an acidic solution to facilitate the reaction between the water glass and the alcohol. The acidic solution may preferably include one or more acid selected from a group consisting of chloric acid, sulfuric acid, nitric acid, and acetic acid.

The alcohol may preferably be mixed in 0.33 to 1 parts by volume per 1 part by volume of water glass.

The organic solvent may preferably be one or more selected from a group consisting of isopropyl alcohol, hexane, heptane, xylene, and cyclohexane.

The organic silane compound may preferably be one or more selected from a group consisting of trimethylchlorosilane, hexamethyldisilazane, methyltrimethoxysilane, trimethylethoxysilane, ethyltriethoxysilane, and phenyltriethoxysilane.

In step (S2), the organic solvent may preferably be mixed in 1 to 10 parts by volume per 1 part by volume of the wet gel, and the organic silane compound is mixed in 0.1 to 4 parts by volume per 1 part by volume of the wet gel.

In step (S3), combining the upper liquid with the fiber matrix can be by pouring the separated upper liquid as is or wetting the fibrous matrix with the upper liquid, and preferably, the fiberweb can be pressed to increase speed and to adjust thickness of the resultant mat.

Step (S4) may preferably include a first drying step, of drying the upper liquid in a natural state in an ambient environment at a temperature at or below the boiling point of the organic solvent, and a second drying step, of applying heat treatment at a temperature between the boiling point of the organic solvent and 300° C.

An aspect of the invention also provides a mat that is manufactured by a method of manufacturing a mat according to an aspect of the invention as described above.

Another aspect of the invention provides a device for manufacturing a mat that includes: a reactor in which to form a wet gel by mixing water glass, an acidic solution, and alcohol therein, and in which to apply surface-modification to the wet gel by mixing with an organic silane compound and an organic solvent; a fibrous matrix supply unit which supplies a fibrous matrix; a upper liquid discharge unit which discharges a upper liquid from a solution inside the reactor and combines the upper liquid with the fibrous matrix supplied from the fibrous matrix supply unit; and a drier which dries the fibrous matrix combined with the upper liquid.

The drier may preferably include a first drying unit, for drying the upper liquid in a natural state in an ambient environment at a temperature at or below the boiling point of the organic solvent, and a second drying unit, for drying the upper liquid at a temperature between the boiling point of the organic solvent and 300° C.

The second drying unit may preferably utilize a heater that utilizes electrical heating element or a hot air blower that injects hot air inside.

The manufacturing device may preferably further include a pressing roller that presses on the fibrous matrix impregnated with the upper liquid to compress the fibrous matrix to a uniform thickness.

Advantageous Effects of Invention

According to an aspect of the invention, as set forth above, a mat containing silica aerogel can be manufactured using only water glass as raw material, even when applying the drying process in an ambient environment, without using expensive materials or supercritical apparatus.

By combining a modified wet gel solution with a fiber matrix, the coupling to the fibers can be enhanced, and damage to the fibers can be avoided beforehand, while the porous structure of the aerogel can be stabilized, and the properties and content ratio of the aerogel can be improved.

Furthermore, the conventional methods of manufacturing aerogel composites that are performed discontinuously can be improved upon. That is, aerogel mats can be manufactured in a continuous manner, by manufacturing the silica aerogel within a single reactor and combining the aerogel with fiberweb that are supplied from a roll. This can reduce production and equipment costs and enables the continuous mass production of silica aerogel mats.

BRIEF DESCRIPTION OF DRAWINGS

FIG. 1 schematically illustrates a mat manufacturing device according to an embodiment of the invention.

MODE FOR THE INVENTION

Certain embodiments of the invention will be described below in more detail.

First, a description will be provided on a method of manufacturing a mat according to an embodiment of the invention.

A method of manufacturing a mat according to an embodiment of the invention may include the following steps.

First, water glass and alcohol may be mixed in a reactor to prepare a wet gel. During the preparation of the wet gel, an acidic solution can be added, to facilitate the reaction between the water glass and the alcohol. In cases where an acidic solution is added during the preparation of the wet gel, it is possible to add the water glass, acidic solution, and alcohol simultaneously to form the wet gel, and it is also possible to mix the water glass with the acidic solution to synthesize a silica sol and then add the alcohol to prepare the wet gel. The surface of the wet gel thus prepared may be of a silanol group, in a hydrophilic gel state.

Ethanol, isopropyl alcohol, methanol, etc., can be used for the alcohol, while an acid such as chloric acid, sulfuric acid, nitric acid, acetic acid, etc., can be used for the acidic solution.

A conventional method may require adding organic materials such as an emulsifier, a dispersant, etc., to a silica sol to control the size and dispersion of the particles, as well as adding an acidic or basic catalyst for facilitating gelation in performing hydrolysis and condensation. According to an embodiment of the invention, however, a gel can be obtained by adding alcohol to a silica sol without having to perform the above processes.

The alcohol may preferably be mixed in 0.33 parts by volume per 1 part of water glass, as a volume of alcohol beyond this range may not trigger gelation at all or may result in an excessively slow gelation rate.

Next, the wet gel obtained in step 1 may be modified with an organic solvent and an organic silane compound and subjected to solvent exchange. An organic solvent such as isopropyl alcohol, hexane, heptane, xylene, cyclohexane, etc., can be used for the solvent, while trimethylchlorosilane, hexamethyldisilazane, methyltrimethoxysilane, trimethylethoxysilane, ethyltriethoxysilane, phenyltriethoxysilane, etc. can be used for the organic silane compound.

The mixing composition in may preferably be 1 to 10 parts by volume of the solvent per 1 part by volume of the wet gel, and 0.1 to 4 parts by volume of the organic silane compound per 1 part by volume of the wet gel. A volume of the solvent exceeding 10 parts and a volume of the organic silane compound less than 0.1 parts may result in an excessively long reaction time, whereas a volume of the solvent less than 1 part and a volume of the organic silane compound exceeding 4 parts may cause the pore structure of the wet gel to contract, due to a rapid reaction, leading to an increase in density and may cause cracks due to drying shrinkage.

According to an embodiment of the invention, the organic solvent and the organic silane compound can be, in step 2, added directly to the reactor in which the wet gel is obtained in step 1. Thus, since the processing can in a continuous manner from step 1, the process can be simplified, and costs can be reduced.

Next, the upper liquid of the reactor may be separated, and the separated upper liquid may be combined with a fibrous matrix.

As the hydrophilic gel is modified by a surface-modification reaction to obtain hydrophobicity, the reaction products within the reactor may include two solutions separated in different layers. In the solution of the upper layer may be the hydrophobic gel, which has become lighter as the pore water has been replaced by the organic solvent, and the organic solvent, which does not mix with water. In the solution of the lower layer may be mainly water, extracted from inside the gel, as well as alcohol and the reaction's byproducts, which do mix with water. The upper liquid can be separated at a particular height of the reactor, and the separated upper solution may be combined with fibers that are supplied unwound from a roll. Since the upper solution is low in viscosity and has a good flow, the gel can be made to infiltrate the fibers by pouring the upper solution as is or wetting the fibers with the upper solution. For better combining with the fibers, the fibers can be lightly pressed, so that the gel solution may infiltrate the fibers more quickly. In this way, the fibrous matrix can be combined with the silica gel. Then, the fiber matrix combined with gel can be made to pass through two rollers, which may remove excess organic solution while pressing to a certain thickness, so that the drying time can be reduced and the thickness of the resultant aerogel mat can be adjusted.

Next, the fiber matrix combined with the gel may be dried. While the drying process can be performed at a constant temperature, it may be preferable to use a multi-step process, applying first drying in a natural state in an ambient environment at a temperature at or below the boiling point of the organic solvent and applying second drying at a temperature between the boiling point of the organic solvent and 300° C. Thus, the rate of shrinkage caused by the drying of the gel can be regulated by the existence of the fibers, and the coupling forces with respect to the fibers can be improved. This is because the matrix may restrain the shrinkage of the silica network, and thus using the multi-step drying procedure described above can prevent this shrinkage. In cases where hexane is used for the organic solvent, it may be preferable to apply first drying at normal temperature and second drying at 69 to 300° C.

A description will now be provided on a mat manufacturing device according to an embodiment of the invention. FIG. 1 schematically illustrates a mat manufacturing device according to an embodiment of the invention.

The mat manufacturing device according to an embodiment of the invention is a device for manufacturing a mat by applying a method described above of manufacturing a mat according to an embodiment of the invention, and may include a reactor 110, a fibrous matrix supply unit 170, an upper liquid discharge unit 181, and a drier 130, 150.

In the reactor 110, the water glass and alcohol may be mixed to form the wet gel, and the wet gel may be mixed with the organic silane compound and the organic solvent to undergo a surface-modification. The reactor 110 may be equipped with a water glass inlet 111, an acidic solution inlet 112, an alcohol inlet 113, and a solvent inlet 114. The organic solvent and the organic silane compound can be injected together through the solvent inlet 114. The reactor 110 can also be equipped with a stirrer for mixing the materials above.

The upper liquid discharge unit 181 is the part that discharges the upper liquid, from among the solutions of the reactor divided into two portions: the upper solution (A) and the lower solution (B), and transfers the upper liquid to the fibrous matrix 101 supplied from the fibrous matrix supply unit 170. The upper solution (A) discharged through the upper liquid discharge unit 181 may contain the hydrophobicized silica gel, which may be combined with the fibrous matrix.

The fibrous matrix supply unit 170 is the part that continually supplies the fibrous matrix, where the fibrous matrix 101 supplied by the fibrous matrix supply unit 170 may be conveyed by a conveying means such as a conveyor belt 191 to undergo processes such as combining with the upper liquid, drying, etc.

The drier 130, 150 is the part that dries the fibrous composite, which is combined with the upper liquid supplied from the upper liquid discharge unit. In order to prevent cracks or fractures, which may occur during the drying of the hydrophobicized gel, the drier 130, 150 may preferably include a first drying unit 130 and a second drying unit 150. Here, the first drying unit may dry the fiber composite at a temperature between normal temperature and a point at or below the boiling point of the organic solvent, and the second drying unit may dry the fiber composite at a temperature between the boiling point of the organic solvent and 300° C. The second drying unit 150 can include a heater that utilizes electrical heating element or a hot air blower that injects hot air inside.

The mat manufacturing device can further include a pressing roller 140, which may press the fibrous matrix 101 impregnated with the upper liquid and compress it to a uniform thickness.

Certain examples will now be presented for easier understanding of the invention. However, the examples below are intended merely to illustrate the example and do not limit the invention. It is apparent to the skilled person that various changes and alterations can be made to the following examples without departing from the scope and spirit of the invention, and it is to be appreciated that such changes and alterations are encompassed by the scope of the appended claims.

Example 1

A water glass solution having silica as a main component was placed in a reactor. A speed-controllable stirrer for mixing the materials was installed in the reactor. 1M of chloric acid was added in a volume fraction of ⅓ of the water glass, and the mixture was stirred at a low speed for 2 minutes. To the sol thus produced, ethanol was added and stirred in a volume ratio of 1:1, to synthesize a wet gel. The silica surface of the wet gel was of a silanol group, in a hydrophilic-surfaced gel. Next, a modification reaction was performed to obtain a hydrophobic surface, the reaction taking place after sequentially adding isopropyl alcohol, hexane, and trimethylchlorosilane. As the hydrophilic gel was modified to have hydrophobicity, two solutions were separated in different layers. The upper solution was poured onto a fiber matrix having a size of 15 15 1.25 $cm^3$ and a density of 0.1 g/mL. The fibers combined with gel were dried at a first temperature of normal temperature and at a second temperature selected within a range between the boiling point of the organic solvent and 300° C. The final synthesized aerogel composite was retrieved and analyzed. The volume density of the final synthesized sheet and the volume percentage of the aerogel with respect to the fibers inside the aerogel mat are represented in Table 1.

Example 2

By substantially the same method as that in Example 1, the fibers stacked with hydrophobic gel were obtained. A certain amount of pressure was applied to the fibers to compress the fibers to a thickness of 1.25 cm. The compressed fiber sheet was dried in substantially the same way as in Example 1. For the analysis of the aerogel composite, the volume density of the final synthesized sheet and the volume percentage of the aerogel with respect to the fibers inside the aerogel mat are represented in Table 1.

Example 3

By substantially the same method as that in Example 1, a hydrophobic gel was obtained. The upper solution was vaporized until the remaining volume was ½. As the hexane-based upper solution is vaporized, the mass ratio of the hydrophobic gel to the upper solution is increased. The processes of combining with the fibers and drying were performed in substantially the same way as in Example 1. The volume density of the final synthesized mat and the volume percentage of the aerogel with respect to the fibers inside the aerogel mat are represented in Table 1.

TABLE 1

| Example | Mat Density [g/mL] | Aerogel Volume Percentage [%] |
| --- | --- | --- |
| Example 1 | 0.102 | 5.3 |
| Example 2 | 0.102 | 10.8 |
| Example 3 | 0.100 | 13.3 |

The invention claimed is:

1. A method of manufacturing a mat containing silica aerogel, the method comprising:
   (S1) producing a wet gel by mixing water glass, an acidic solution, and alcohol in a reactor;
   (S2) modifying a surface of the wet gel by adding an organic silane compound and an organic solvent to the reactor and mixing;
   (S3) separating an upper liquid from a solution in the reactor and impregnating a fibrous matrix with the upper liquid; and
   (S4) drying the fibrous matrix impregnated with the upper liquid.

2. The method of claim 1, wherein the alcohol is selected from the group consisting of ethanol, isopropyl alcohol, methanol, and combinations thereof.

3. The method of claim 1, wherein the acidic solution comprises one or more acids selected from the group consisting of chloric acid, sulfuric acid, nitric acid, and acetic acid.

4. The method of claim 1, wherein the alcohol is mixed in 0.33 to 1 parts by volume per 1 part by volume of the water glass.

5. The method of claim 1, wherein the organic solvent is selected from the group consisting of isopropyl alcohol, hexane, heptane, xylene, cyclohexane, and combinations thereof.

6. The method of claim 1, wherein the organic silane compound is selected from the group consisting of trimethylchlorosilane, hexamethyldisilazane, methyltrimethoxysilane, trimethylethoxysilane, ethyltriethoxysilane, phenyltriethoxysilane, and combinations thereof.

7. The method of claim 1, wherein in said step (S2), the organic solvent is mixed in 1 to 10 parts by volume per 1 part by volume of the wet gel, and the organic silane compound is mixed in 0.1 to 4 parts by volume per 1 part by volume of the wet gel.

8. The method of claim 1, wherein said step (S4) comprises a first drying step, of drying the upper liquid at a temperature between normal temperature and a point at or below a boiling point of the organic solvent, and a second drying step, of drying the upper liquid at a temperature between a boiling point of the organic solvent and 300° C.

* * * * *